Feb. 3, 1953 H. E. JENSEN 2,627,533
BATTERY TERMINAL POST MOUNTING
Filed July 19, 1951
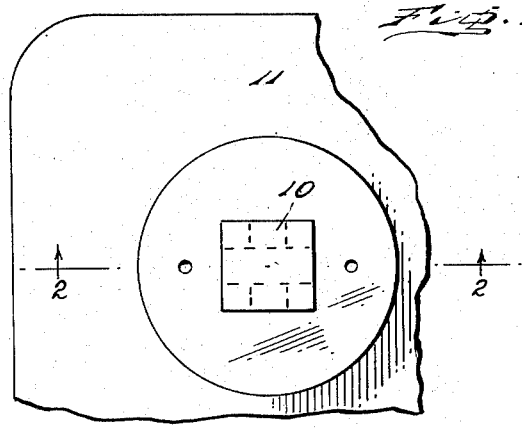
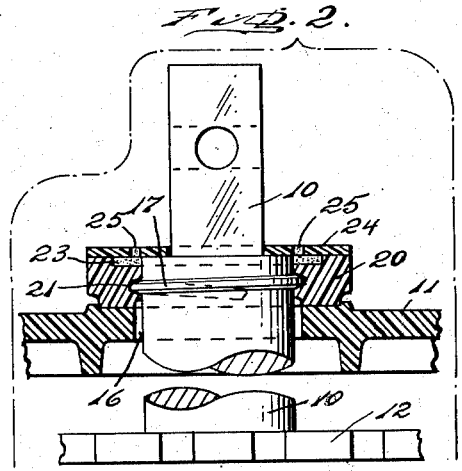
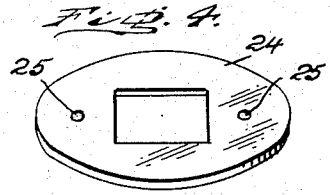
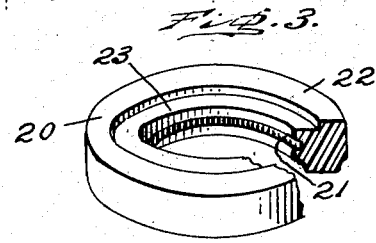
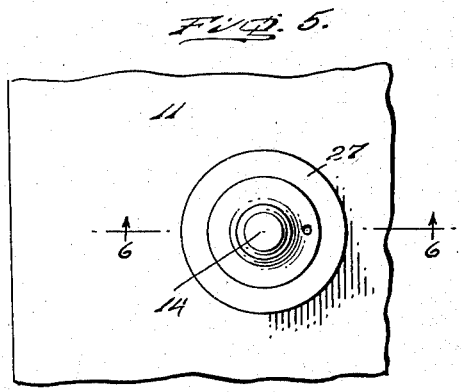
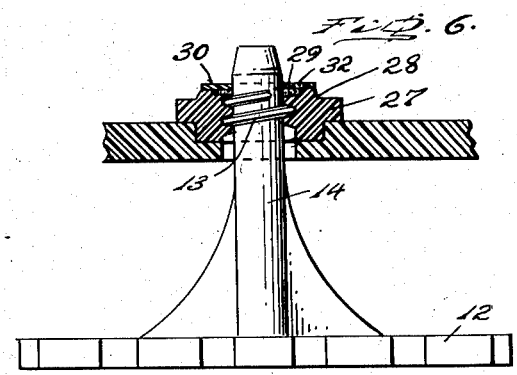
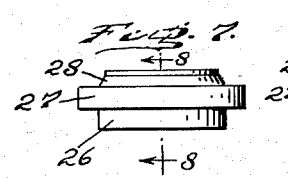
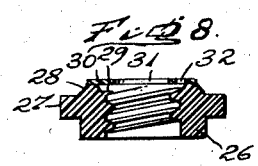
INVENTOR
Henry E. Jensen.
BY Robert M. Barr
ATTORNEY.

Patented Feb. 3, 1953

2,627,533

UNITED STATES PATENT OFFICE 2,627,533

BATTERY TERMINAL POST MOUNTING

Henry E. Jensen, Norristown, Pa., assignor to C & D Batteries, Inc., Conshohocken, Pa., a corporation of Pennsylvania Application July 19, 1951, Serial No. 237,499

3 Claims. (Cl. 136—135)

The present invention relates to storage batteries and more particularly to a novel terminal post and cover assembly forming an effective post seal for batteries of the plastic case and cover type.

In battery terminal posts it has been conventional practice to endeavor to seal the junction in the cover through which the posts protrude by compressing a rubber gasket between the cover and the post. This was accomplished by providing a fixed shoulder on the post which seats on the underside of the battery cover while the part of the post extending through the cover is threaded to receive a clamping nut, which in association with a soft rubber gasket anchors and seals the post in place upon the cover. In certain instances soft compounds were added to seal the interstices between the threads of the posts and that of the clamping nuts. Mechanical clamping of a rubber gasket invariably will allow acid creepage and leakage after the gasket has taken a set. Furthermore, the gaskets deteriorate long before the useful life of the battery. This is highly objectionable where modern batteries have a useful life of fourteen years and upwards. Another disadvantage is the required use of a grease or other soft compound as a seal around the protruding post and nut open to the atmosphere which serves to collect dust and dirt around the exposed parts. Another serious disadvantage of this mechanical anchoring of the post is the stress on the cover and the almost invariable misalignment of the post shoulder with the cover in assembly, making it extremely difficult to produce an effective seal without cover distortion. Thus, in one instance the vertical length of the plates and post brings the shoulder too high, with resulting stress on the cover when the nut is clamped in place. In another instance, a shorter vertical length brings the shoulder below the cover so that the plate assembly hangs directly from the cover with resulting stress.

Some of the objects of the present invention are: to provide an improved terminal post seal for storage batteries of the plastic case and cover type; to provide a novel means for attaching a terminal post to a plastic battery cover; to provide a terminal post seal for a storage battery wherein the use of a post shoulder is eliminated; to provide a terminal post assembly wherein a sealing gasket is unnecessary; to provide a terminal post cover assembly wherein precise cover and post alinement is so inherent that the cover is never subject to stresses tending to produce leaks in the cover seal as formerly occurred in prior assemblies by alinement variations; to provide a post seal assembly for plastic battery covers wherein the parts are united without placing the plastic under compression, which latter is present under mechanical clamping which may cause crazing of the cover; and to provide other advantages and objects as will hereinafter appear.

In the accompanying drawing, Fig. 1 represents a fragmentary plan of a battery cover showing a terminal post assembly embodying one form of the present invention; Fig. 2 represents a section on line 2—2 of Fig. 1, but showing the terminal post in elevation; Fig. 3 represents a perspective of the form of post clamping nut used in the assembly of Fig. 2; Fig. 4 represents a perspective of a cover disc for association with the nut of Fig. 3; Fig. 5 represents a fragmentary plan of a battery cover showing a post assembly embodying another form of the invention; Fig. 6 represents a section on line 6—6 of Fig. 5, but showing the terminal post in elevation; Fig. 7 represents a side elevation of the post nut used in the assembly of Fig. 6; Fig. 8 represents a section on line 8—8 of Fig. 7; and Fig. 9 represents a plan of a cover disc for association with the nut of Fig. 7.

Referring to Figs. 1 to 4 of the drawings, one form of the present invention comprises a post 10, at least cylindrical where it is to pass through the jar or case cover 11, and having the conventional slotted bar 12 for properly spacing the battery plates, which latter, as usual, seat on upstanding rails on the bottom of the case. That portion of the post 10 which protrudes externally through the hole 16 of the cover 11 is provided with an external thread 17, preferably of the rounded type and of a relatively long pitch for a purpose which will later appear. In the preferred form of the invention, the cover 11 is molded of a synthetic plastic such for example as polystyrene and is provided with as many post-receiving holes 16 as are required for the number of cells in the battery. Thus, in a single cell battery, two post holes 16 are provided in addition, of course, to a filler opening (not shown).

In order to anchor a post 10 to the cover 11, a nut 20 of plastic material is provided having internal threads 21 for proper meshing with the post threads 17. This nut 20 is of greater diameter than the hole 16 in order to seat upon the upper face of the cover, while its top is formed with an annular rim flange 22 forming an inner annular groove 23 communicating with the aforesaid internal threads 21. The groove 23 forms a space for the reception of sealing grease and is covered by an annular disc 24, of plastic material dimensioned to seat upon the upper face of the nut 20, and to which it is bonded by a plastic cement or heat sealed, of the type which forms a joint comparable to a weld. The disc 24 is provided with one or more ports 25 forming conduits leading to the groove 23, whereby a sealing grease can be extruded from a suitable grease gun into the groove 23 and around the threads of the nut 20 as a final seal after the nut 20 is in its position about a post as assembled on the cover 11. Preferably the disc 24 is transparent so that the grease operator can properly check the filling operation and avoid waste of an expensive grease.

In applying the nut 20 to a post 10, its cover contacting face is coated with a plastic solvent capable of reacting with the plastic cover to form a weld-like bond, whereupon the nut is threaded into anchoring position upon the post and seated at the proper position. The bond is completed as soon as the solvent has migrated into the plastic nut and cover. If desired, heat sealing the nut to the cover may be substituted.

The post 10 is of the type having a square end for cable clamp attachment and therefore the disc 24 is provided with a complemental opening for the passage of the plug and in such construction the disc 24 is applied to the nut 20 and solvent bonded in place, like the nut to the cover after the post has been anchored by the nut 20. Where the post terminal is cylindrical the disc hole is of like shape and dimension, and can therefore be applied to the nut prior to screwing the nut on the post.

In the form of the invention shown in Figs. 5 to 9, the plastic cover is counter-bored about each post hole 16 to provide a seat for an annular boss 26 formed on the bottom of the enlarged diameter plastic nut 27, which latter in assembled position overlies and contacts the upper face of the cover 11. The nut 27 and its boss 26 are internally threaded for complemental meshing with the thread 13 of the post 14, which latter carries the battery plate slotted bar 15. It should be noted that the threads of the two meshing parts are preferably of the rounded type and of relatively long pitch to form suitable clearances for the reception of sealing grease.

For the purpose of leading sealing grease into the threads and about the post, the upper face of the nut 27 is formed with an upstanding annular concentric rib 28 having a diameter larger than the threaded hole of the nut to provide a depressed shelf 29 which thus forms a receptacle into which the grease is discharged by the pressure gun and from which it can travel into and along the post threads. A plastic disc 30 forms a cover to seat upon the rib 28, and has an opening 31 to fit snugly about the post. A port 32 is provided through the disc 30 for communication with the aforesaid shelf receptacle so that grease under gun pressure can complete the sealing of the parts encircling the post.

In this form of the invention the nut 27 is anchored as a unitary part of the plastic battery cover by the aforesaid plastic bonding solvent or heat sealed about the boss 26 and on the under face of the nut 27, so that a unitary bonded joint is formed.

It will now be apparent that a complete unitary mounting has been devised for assembling a terminal post upon the cover of a storage battery and which eliminates the customary inner shoulder on a post required as a clamping element under pressure of an applied nut. The present novel construction ensures precise accurate alinement of the post with the battery cover regardless of any variations in the length of the post when attached to the battery plates. Hence, the fastening nut can be clamped tight without placing any stress upon the cover, which stress, heretofore, by reason of vertical variations in the position of the post shoulder, causes distortion preventing effective sealing of the cover.

Having thus described my invention, I claim:
1. In a battery terminal post sealing assembly, the combination of a plastic battery cover having a terminal post hole, a terminal post for insertion through said hole in said cover with a part protruding above said cover and a part below and inwardly spaced from the inner face of said cover, a thread on said protruding part, a plastic nut for said post to seat on the outer face of said cover, solvent means bonding said nut as an integral part of said cover, and means on said nut forming a clearance encircling said post to receive grease as a seal for said post thread.

2. In a battery terminal post sealing assembly in accordance with claim 1, wherein an apertured plastic disc encircles said post and seats on said nut to seal said clearance, said disc having a port communicating with said clearance for introducing sealing grease, and solvent means bonding said disc to said nut.

3. In a battery terminal post sealing assembly, the combination of a plastic battery cover having a terminal post hole, a terminal post for insertion through said hole in said cover with a part protruding above said cover and a part below and inwardly spaced from the inner face of said cover, an external thread on said protruding part, a plastic nut on said post seating on said cover, said nut having a groove in its upper face encircling and opening against said post, solvent means between said nut and cover bonding said parts integrally together, and a plastic disc encircling said post and seating on said nut as a closure for said groove, said disc having a port communicating with said groove, whereby sealing grease can be introduced to said groove and thread.

HENRY E. JENSEN.

REFERENCES CITED

The following references are of record in the file of this patent:

UNITED STATES PATENTS

| Number | Name | Date |
|---|---|---|
| 1,150,918 | Willard | Aug. 24, 1915 |
| 1,327,542 | Frey | Jan. 6, 1920 |
| 1,352,619 | Norris | Sept. 14, 1920 |
| 1,363,646 | Gould | Dec. 28, 1920 |
| 1,372,603 | Cook | Mar. 22, 1921 |
| 1,791,470 | Runkle | Feb. 3, 1931 |
| 2,277,376 | Vakula | Mar. 24, 1942 |

FOREIGN PATENTS

| Number | Country | Date |
|---|---|---|
| 906 | Great Britain | Jan. 12, 1911 |
| 21,043 | Great Britain | Sept. 22, 1906 |
| 29,773 | Great Britain | Dec. 20, 1909 |
| 651,662 | France | Feb. 21, 1929 |
| 917,861 | France | Jan. 23, 1947 |